US009195656B2

(12) United States Patent
Fructuoso et al.

(10) Patent No.: US 9,195,656 B2
(45) Date of Patent: Nov. 24, 2015

(54) MULTILINGUAL PROSODY GENERATION

(71) Applicant: Google Inc., Mountain View, CA (US)

(72) Inventors: Javier Gonzalvo Fructuoso, London (GB); Andrew W. Senior, New York, NY (US); Byungha Chun, Epsom (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/143,627

(22) Filed: Dec. 30, 2013

(65) Prior Publication Data

US 2015/0186359 A1    Jul. 2, 2015

(51) Int. Cl.
*G10L 13/08* (2013.01)
*G06F 17/28* (2006.01)
*G10L 13/10* (2013.01)

(52) U.S. Cl.
CPC .............. *G06F 17/289* (2013.01); *G10L 13/08* (2013.01); *G10L 13/086* (2013.01); *G10L 13/10* (2013.01)

(58) Field of Classification Search
CPC ........ G10L 13/08; G10L 13/086; G10L 13/10
USPC ......................................................... 704/260
See application file for complete search history.

(56) References Cited

U.S. PATENT DOCUMENTS

| | | | |
|---|---|---|---|
| 5,636,325 A * | 6/1997 | Farrett | 704/258 |
| 5,729,694 A | 3/1998 | Holzrichter et al. | |
| 6,141,642 A | 10/2000 | Oh | |
| 6,675,143 B1 * | 1/2004 | Barnes et al. | 704/257 |
| 6,920,423 B2 | 7/2005 | Mueller et al. | |
| 7,043,431 B2 | 5/2006 | Riis et al. | |
| 7,275,032 B2 | 9/2007 | Macleod | |
| 7,406,408 B1 * | 7/2008 | Lackey et al. | 704/8 |
| 7,409,340 B2 | 8/2008 | Holzapfel et al. | |
| 7,593,842 B2 | 9/2009 | Rousseau | |
| 7,765,101 B2 | 7/2010 | En-Najjary et al. | |
| 7,848,924 B2 | 12/2010 | Nurminen et al. | |
| 7,912,727 B2 | 3/2011 | Gao et al. | |
| 7,996,222 B2 | 8/2011 | Nurminen et al. | |
| 8,073,696 B2 | 12/2011 | Kato et al. | |
| 8,170,878 B2 | 5/2012 | Liu et al. | |
| 8,204,739 B2 | 6/2012 | Waibel et al. | |
| 8,260,615 B1 | 9/2012 | Nakajima et al. | |
| 8,442,830 B2 | 5/2013 | Nakajima et al. | |
| 8,744,847 B2 * | 6/2014 | Paul et al. | 704/233 |

(Continued)

OTHER PUBLICATIONS

Agüero et al., "Automatic analysis and synthesis of Fujisaki's intonation model for TTS," *Speech Prosody 2004, International Conference*, 2004, 4 pages.

(Continued)

*Primary Examiner* — Jakieda Jackson
(74) *Attorney, Agent, or Firm* — Fish & Richardson P.C.

(57) ABSTRACT

Methods, systems, and apparatus, including computer programs encoded on a computer storage medium, for multilingual prosody generation. In some implementations, data indicating a set of linguistic features corresponding to a text is obtained. Data indicating the linguistic features and data indicating the language of the text are provided as input to a neural network that has been trained to provide output indicating prosody information for multiple languages. The neural network can be a neural network having been trained using speech in multiple languages. Output indicating prosody information for the linguistic features is received from the neural network. Audio data representing the text is generated using the output of the neural network.

20 Claims, 5 Drawing Sheets

(56) References Cited

U.S. PATENT DOCUMENTS

| | | | |
|---|---|---|---|
| 8,751,238 B2* | 6/2014 | James et al. | 704/260 |
| 2002/0072909 A1 | 6/2002 | Eide et al. | |
| 2004/0024585 A1* | 2/2004 | Srivastava et al. | 704/10 |
| 2004/0049375 A1* | 3/2004 | Brittan et al. | 704/9 |
| 2004/0111272 A1 | 6/2004 | Gao et al. | |
| 2005/0144003 A1 | 6/2005 | Iso-Sipila | |
| 2005/0187773 A1 | 8/2005 | Filoche et al. | |
| 2005/0267755 A1 | 12/2005 | Suontausta | |
| 2006/0253272 A1 | 11/2006 | Gao et al. | |
| 2007/0208566 A1 | 9/2007 | En-Najjary et al. | |
| 2008/0004858 A1 | 1/2008 | Gao et al. | |
| 2009/0055160 A1 | 2/2009 | Gao et al. | |
| 2009/0099841 A1 | 4/2009 | Chen | |
| 2009/0281789 A1 | 11/2009 | Waibel et al. | |
| 2010/0057435 A1 | 3/2010 | Kent et al. | |
| 2010/0198577 A1 | 8/2010 | Chen et al. | |
| 2011/0238407 A1* | 9/2011 | Kent | 704/3 |
| 2012/0173241 A1* | 7/2012 | Li et al. | 704/260 |
| 2012/0191457 A1* | 7/2012 | Minnis et al. | 704/260 |
| 2012/0253781 A1 | 10/2012 | Qian et al. | |
| 2013/0041669 A1* | 2/2013 | Ben-David et al. | 704/260 |
| 2013/0289998 A1* | 10/2013 | Eller et al. | 704/260 |
| 2014/0019138 A1* | 1/2014 | Stephens, Jr. | 704/260 |

OTHER PUBLICATIONS

Erdem et al., "An Adaptable Acoustic Architecture in a Multilingual TTS System," Proceedings of International Conference: Speech Prosody 2004, Nara-Ken New Public Hall, Nara, Japan, Mar. 23-26, 2004, 4 pages.

Fackerell et al., "Multilingual Prosody Modelling Using Cascades of Regression Trees and Neural Networks," *Proceedings EUROSPEECH*, 1999, 4 pages.

Hoffmann et al., "Evaluation of a Multilingual TTS System with Respect to the Prosodic Quality," Proceedings of International Congress of Phonetic Sciences (*ICPhS*), 1999, 2307-2310.

Hwang and Chen, "Neural-network-based F0 text-to-speech synthesizer for Mandarin," *IEE Proc. Vis. Image Signal Process*, Dec. 1994, 141:384-390.

"Intonation (Linguistics)," *Wikipedia, the free encyclopedia*, accessed Aug. 27, 2013, 11 pages, http://en.wikipedia.org/wiki/Intonation_(linguistics).

Iriondo et al., "Modelado y Estimoacion de la Prosodia Mediante Razonamiento Basado en Casos," *Zaragoza*, Nov. 2006, 183-188 (English Abstract).

"Isochrony," *Wikipedia, the free encyclopedia*, accessed Aug. 27, 2013, 4 pages, http://en.wikipedia.org/wiki/Isochrony.

Jokisch et al., "Towards a Multilingual Prosody Model for Text-to-Speech," *IEEE ICASSP*, 2002, 421-424.

Vaissière, J., "Language Independent Prosodic Features." In A. Cutler & R. Ladd (Eds.), Prosody: Models and Measurements, (53-65), 1983, 34 pages.

Macias-Guarasa et al., "Novel Applications of Neural Networks in Speech Technology Systems: Search Space Reduction and Prosodic Modeling," *Intelligent Automation and Soft Computing*, 2009, 15(4):631-646.

Boula de Mareüil et al., "Contribution of Prosody to the Perception of Spanish/Italian *accents*," Speech Prosody 2004, International Conference, 2004, 4 pages.

Müller et al., "Designing Prosodic Databases for Automatic Modeling of Slovenian Language in Multilingual TTS System," *Proceeding of the 3rd international conference on Language resources and Evaluation, LREC*, 2002, May 2002, 5 pages.

Narusawa et al., "Automatic Extraction of Model Parameters From Fundamental Frequency Contours of English Utterances," 7th International Conference on Spoken Language Processing, ICSLP2002—INTERSPEECH 2002 (*Proc.ICSLP*), 2002, 1725-1728.

"Neural Network," *Wikipedia, the free encyclopedia*, accessed Aug. 27, 2013, 9 pages, http://en.wikipedia.org/wiki/Neural_network.

Nöth et al., "A Multilingual Prosody Module in a Speech-to-Speech Translation System," *From the Proceeding of the Workshop of Multi-Lingual Speech Communication*, 2000, pp. 110-115.

Cummins and Port, "Rhythmic constraints on stress timing in English," *Journal of Phonetics*, 1998, 26:145-171.

"Prosody (linguistics)," *Wikipedia, the free encyclopedia*, accessed Aug. 27, 2013, 5 pp., http://en.wikipedia.org/wiki/Prosody_(linguistics).

Romsdorfer, "Polygot Speech Prosody Control," *Interspeech 2009 Brighton*, 2009, pp. 488-491.

Sakurai and Minematsu, "Generation of $F_0$ Contours Using a Model-Constrained Data-Driven Method," ICASSP, 2001, pp. 817-820.

"Speech Synthesis," *Wikipedia, the free encyclopedia*, accessed Aug. 27, 2013, 16 pages, http://en.wikipedia.org/wiki/Speech_synthesis.

"Stress (linguistics)," *Wikipedia, the free encyclopedia*, accessed Aug. 27, 2013, 6 pages, http://en.wikipedia.org/wiki/Stress_(linguistics).

Sun et al., "Improved Prediction of Tone Components for $F0$ Contour Generation of Mandarin Speech Based on the Tone Nucleus Model," Proc. International Conference on Speech Prosody, 2008, 4 pages.

Xydas and Kouroupetroglou, "Tone-Group $F0$ selection for modeling focus prominence in small-footprint speech synthesis," *Speech Communication*, 2006, 48(9):1057-1078.

Zen et al., "Statistical Parametric Speech Synthesis Using Deep Neural Networks," in Proceedings of 38th International Conference on Acoustics, Speech, and Signal Processing (ICASSP 2013), pp. 7962-7966, May 2013, 5 pages.

Zen et al., "Statistical Parametric Speech Synthesis Based on Speaker and Language Factorization," *IEEE Transactions on Audio, Speech & Language Processing*, 2012, 12 pages.

Kurimo et al., "Personalising speech-to-speech translation in the EMIME project," Proceedings of the ACL 2010 System Demonstrations, pp. 48-53, Jul. 13, 2010.

Liang et al., "A comparison of supervised and unsupervised cross-lingual speaker adaptation approaches for HMM-based speech synthesis," 2010 IEEE International Conference on Acoustics Speech and Signal Processing (ICASSP) pp. 4598-4601, Mar. 14-19, 2010.

Microsoft Research, "Turning a monolingual speaker into multilingual speaker," Microsoft Research [online], Apr. 20, 2012 [retrieved on Jun. 17, 2013] Retrieved from the Internet using the Wayback Machine: < URL: http://web.archive.org/web/20120420120027/http://research.microsoft.com/en-us/projects/mixedlangtts/default.aspx> 3 pages.

Oura et al., "Unsupervised Cross-Lingual Speaker Adaptation for HMM-Based Speech Synthesis," 2010 IEEE International Conference on Acoustics Speech and Signal Processing (ICASSP), pp. 4594-4597, Mar. 14-19, 2010.

Qian and Soong, "A unified trajectory tiling approach to high quality TTS and cross-lingual voice transformation," 2012 8th International Symposium on Chinese Spoken Language Processing (ISCSLP), Dec. 5-8, 2012, pp. 165-169.

"Machine translator speaks Chinese in your own voice," New Scientist blog post dated Nov. 9, 2012, found online at: http://www.newscientist.com/blogs/onepercent/2012/11/micirosofts-brainlike-tranlat.html.

Hattori et al., "Speaker-adaptive speech synthesis based on eigenvoice conversion and language dependent prosodic conversion in speech-to-speech translation," In INTERSPEECH—2011, pp. 2769-2772, 2011.

Qian et al., "A cross-language state sharing and mapping approach to bilingual (Mandarin-English) TTS", In IEEE Transactions on Audio, Speech, and Language Processing, vol. 17, No. 6, pp. 1231-1239, 2009.

Qian et al., "A frame mapping based HMM approach to cross-lingual voice transformation," In ICASSP—2011, pp. 5120-5123, 2011.

Wu et al., "State mapping based method for cross-lingual speaker adaptation in HMM-based speech synthesis", In INTERSPEECH—2009, pp. 528-531, 2009.

Lamel, Lori, et al. "Speech recognition for machine translation in Quaero." Proceedings of the International Workshop on Spoken Language Translation (IWSLT), San Francisco, CA. 2011.

\* cited by examiner

MULTILINGUAL PROSODY GENERATION

FIELD

This specification describes technologies related to speech synthesis.

BACKGROUND

Text-to-speech systems can be used to artificially generate an audible representation of a text. Text-to speech systems typically attempt to approximate various characteristics of human speech, such as the sounds produced, rhythm of speech, and intonation.

SUMMARY

A prosody model for use in text-to-speech synthesis may be trained using speech from multiple languages, so that the model can indicate prosody information for each of the multiple languages. Instead of training a separate prosody model for each language, a single prosody model may incorporate information about the prosody of multiple languages. The prosody model can be, for example, a neural network or other data-driven model.

By training the prosody model with speech from different languages, the model may take advantage of similarities between the languages. For example, characteristics of speech in one language may affect the prosody information that the model outputs for another language. As an example, if only a small amount of training data is available for a first language (such as Portuguese), the model may generate prosody information based in part on characteristics observed in a linguistically similar language (such as Spanish or Italian).

To generate prosody information for text, linguistic features of the text can be input to the prosody model with a language identifier that indicates the language of the text. The prosody model outputs prosody information, such as fundamental frequency coefficients, duration values, and energy values, which can be used to generate audio data that represents the text (e.g., audio data including a synthesized utterance of the text). The same prosody model can be used to generate prosody information for a second text in a different language. Linguistic features of the second text can be input to the prosody model with a second language identifier that identifies the language of the second text, and the prosody model outputs prosody information that can be used to generate an audio representation of the second text.

In a general aspect, a method performed by data processing apparatus includes obtaining data indicating a set of linguistic features corresponding to a text; providing (i) data indicating the linguistic features and (ii) data indicating the language of the text as input to a neural network that has been trained to provide output indicating prosody information for multiple languages, the neural network having been trained using speech in multiple languages; receiving, from the neural network, output indicating prosody information for the linguistic features; and generating audio data representing the text using the output of the neural network.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Implementations may include one or more of the following features. For example, the text is a first text in a first language. The method may include: obtaining data indicating a set of second linguistic features corresponding to a second text in a second language that is different from the first language; providing (i) data indicating the second linguistic features and (ii) data indicating the language of the second text as input to the neural network that has been trained to provide output indicating prosody information for multiple languages; receiving, from the neural network, second output indicating prosody information for the second linguistic features; and generating an audio representation of the second text using the second output of the neural network. Receiving, from the neural network, output indicating prosody information includes receiving data indicating one or more of a duration, an energy level, and one or more fundamental frequency coefficients. The method may include determining a linguistic group that includes a subset of the linguistic features in the set of linguistic features. Providing data indicating the linguistic features to the neural network includes providing data indicating the subset of linguistic features in the linguistic group as input to the neural network. Receiving, from the neural network, output indicating prosody information for the linguistic features includes receiving, from the neural network, output indicating prosody information for the linguistic group. Obtaining data indicating the set of linguistic features corresponding to the text includes obtaining data indicating a sequence of linguistic features in a phonetic representation of the text. Determining the linguistic group includes determining the linguistic group based on a position of one or more stressed linguistic features in the sequence of linguistic features.

Implementations may include one or more of the following features. The method may include determining multiple linguistic groups within the set of linguistic features, each of the multiple linguistic groups including a different portion of the set of linguistic features. Providing (i) data indicating the linguistic features and (ii) data indicating the language of the text as input to the neural network includes providing, for each of the multiple linguistic groups, data indicating the linguistic features in the linguistic group and data indicating the language of the text. Receiving, from the neural network, the output indicating prosody information for the linguistic features includes receiving, from the neural network, a set of output indicating prosody information for each of the multiple linguistic groups. Generating the audio data representing the text using the output of the neural network includes: using the output of the neural network to determine a fundamental frequency contour for each of the multiple linguistic groups; concatenating the fundamental frequency contours for the multiple linguistic groups to generate a continuous fundamental frequency contour for the text; and generating the audio representation using the continuous fundamental frequency contour. Generating the audio data representing the text using the output of the neural network includes selecting one or more recorded speech samples based on the output of the neural network. Generating the audio data representing the text using the output of the neural network includes generating the audio representation using the output of the neural network and audio coefficients representing synthesized speech characteristics.

Advantageous implementations can include one or more of the following features. A single prosody model may be used to provide prosody information for different languages. The naturalness of prosody information provided by a prosody model may be improved. Training a prosody model with speech from multiple languages can improve the quality of prosody information provided for languages for which only relatively small amounts of training data is available. The amount of training data needed to train a prosody model for a particular language may be reduced when the prosody model is also trained with utterances of other languages.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
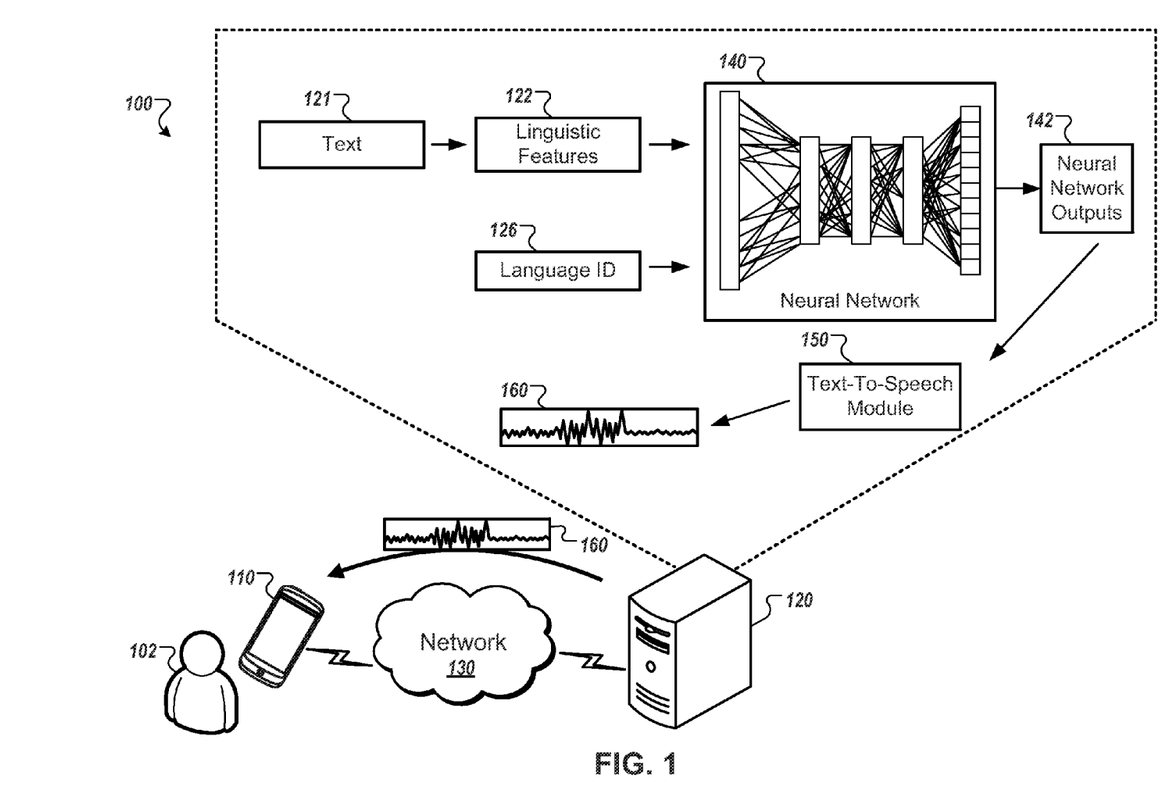
FIG. 1 is a block diagram that illustrates an example of a system for multilingual prosody generation.

FIG. 1 is a block diagram that illustrates an example of a system 100 for multilingual prosody generation. The system 100 includes a client device 110, a computing system 120, and a network 130. In the example, the computing system 120 generates audio data 160 (e.g., synthesized speech) corresponding to text, and provides the audio data 160 to the client device 110 over the network 130. As part of generating the audio data 160, the computing system 120 obtains prosody information from a prosody model, such as a neural network 140, that has been trained using speech from multiple languages.

In some implementations, the computing system 120 obtains data indicating a set of linguistic features corresponding to a text. The computing system 120 may provide (i) data indicating the linguistic features and (ii) data indicating the language of the text as input to the neural network 140. The neural network 140 can be a neural network that has been trained to provide output indicating prosody information for multiple languages, and has been trained using speech in multiple languages. The computing system 120 receives output from the neural network 140 indicating prosody information for the linguistic features. The computing system 120 then generates audio data representing the text using the output of the neural network 140.

Prosody may refer generally to the manner in which speech is delivered, separate from the types of sounds made or identity of the particular words spoken. For example, prosody includes characteristics such as the rhythm, stress, and intonation of speech. Prosody can reflect speaking style, emphasis, emotion, and other aspects of the manner in which words are uttered. For example, for a given phrase, prosody can indicate whether the phrase is pronounced quickly or slowly, at what intonation, and what sounds are emphasized.

The prosody of synthesized speech is a factor that affects how natural the synthesized speech sounds to a listener. Even if synthesized speech includes the correct sounds corresponding to a word or phrase, a listener may consider the speech to be unnatural if the sounds are produced at, for example, an unnatural pitch, speed, or rhythm. As a result, obtaining appropriate prosody information can be an important factor in producing high-quality synthesized speech.

Some prosody models are trained to generate prosody information for a single target language, using speech from only the target language as training data. For example, a prosody model for generating English-language prosody information is typically trained using only English speech samples as training data. A prosody model for generating Spanish-language prosody information is typically trained using only Spanish speech samples as training data.

In single-language prosody models, the training data is often assumed to represent prosody for the single language. For example, even if training data for a single-language prosody model included an utterance of a word that originates in a different language (e.g., an English technical term that is also used in Spanish) or mistakenly included an English pronunciation, single-language prosody models typically do not distinguish the training data as corresponding to different languages. As a result, in this example, the training system and the single-language prosody model would consider the English term to be a Spanish term, the same as the other Spanish terms used in training. Thus the prosody of the training examples is assumed to represent usage and prosody of the single language of the single-language prosody model.

Similarly, single-language prosody models typically do not receive inputs that indicate which of several languages the output prosody information should be provided. Thus these models generally cannot provide prosody information that is targeted to one language and also provide prosody that is targeted to another, different language and has different characteristics.

To obtain prosody information for multiple languages, some text-to-speech systems may use a collection of separate, independently-trained prosody models that are each trained, using utterances generally from a single language, to provide prosody output for that same single language. Even if multiple different models may be trained using the same processing framework or a common set of procedures, each single-language model is trained independently, using training data for its corresponding language and without training using inputs indicating training examples correspond to different languages.

By contrast with single-language prosody models which are not trained using utterances indicated to correspond to different languages, for example, those which assume that all training examples and outputs correspond to the same language, in some implementations of the techniques disclosed herein, a multilingual prosody model may be trained with speech from multiple different languages. During training, utterances from multiple different languages are used to train the model, and the language of each particular training utterance may be indicated to the prosody model, permitting the model to distinguish between utterances in different languages. Thus training can be performed using utterances and phonetic sequences that are explicitly labeled as corresponding to different languages. A single multilingual model may be trained to provide prosody information appropriate for a first language when a language identifier for the first language is provided, and to provide prosody information appropriate for a second language when a language identifier for the second language is provided. The output that the multilingual prosody model provides for a particular language may reflect the individualized characteristics of prosody in the particular language, as indicated by the training data for the particular language. In addition, the multilingual prosody model may learn to use prosody characteristics of other languages to enhance the output for the particular language.

Because the multilingual prosody model is trained with speech from different languages, the prosody model can learn similarities and differences among the different languages. The correlations among different languages and linguistic features can be determined automatically through machine learning techniques, e.g., back propagation and updating of neural network weights during training of a neural network. Based on similarities present in the training data for a first language and a second language, the prosody model may learn to enhance prosody output for the first language based on prosody characteristics of utterances in the second language.

As a result of training using utterances from multiple different languages, the multilingual prosody model may provide a first set of prosody outputs in response to input indicating a particular set of linguistic features and a first target language. In some implementations, the same multilingual prosody model, in the same state of training (e.g., the same neural network topology having the same internal weight values and other parameters), may provide a second, different set of prosody outputs in response to input indicating the same particular set of linguistic features and a second, different target language. Thus, by changing which target language is indicated to the multilingual prosody model, different prosody outputs can be obtained from the model, where each output is appropriately focused or targeted for the characteristics of the corresponding language indicated to the model.

In some instances, it may be desirable to be able to synthesize speech in multiple languages. However, it may not be feasible to gather the amount of recorded utterances required to independently train a separate prosody model for each language and achieve a desired level of quality. For example, a text-to-speech system may be developed to synthesize speech in multiple languages including Russian, Bulgarian, and Ukrainian. The set of Russian utterances available for training may be much larger than the sets of Bulgarian or Ukrainian utterances. The multilingual prosody model may be trained with utterances from all of the languages. The model may learn to provide prosody information tailored to the individual characteristics of each individual language from the training data utterances from that language. In addition, based on similarities in the Russian, Bulgarian, and Ukrainian training data, the model may learn to use certain characteristics of Russian training data to improve the prosody modeling of Bulgarian and Ukrainian prosody. For example, when certain combinations of Bulgarian or Ukrainian linguistic features are not present in the Bulgarian or Ukrainian training data, but the same or similar combinations of linguistic features are present in the Russian training data, the model may output Bulgarian or Ukrainian prosody information that is influenced by the characteristics of the Russian training data.

In the example of FIG. 1, the computing system 120 obtains a text 121 for which synthesized speech should be generated. The text 121 may be provided by any appropriate source. For example, the client device 110 may provide the text 121 over the network 130 and request an audio representation. Alternatively, the text 121 may be generated by the computing system 120, accessed from storage, received from another computing system, or obtained from another source. Examples of texts for which synthesized speech may be desired include text of an answer to a voice query, text in web pages, short message service (SMS) text messages, e-mail messages, social media content, user notifications from an application or device, and media playlist information.

The computing system 120 obtains data indicating linguistic features 122 corresponding to the text 121. For example, the computing system 120 may access a lexicon to identify a sequence of phonetic units, such as phonemes, in a phonetic representation of the text 121. The linguistic features can be selected from a phonetic alphabet that includes all possible sounds in all of the languages that the neural network 140 is trained to be used with. As a result, consistent input symbols can be provided to the neural network 140. For example, a symbol or identifier for a particular sound can be assigned and used each time the sound occurs in a phonetic representation, across multiple languages. As an example, to represent an "ah" sound, the same input value may be used whether the sound occurs in English, Spanish, French, or any other language for which the neural network 140 is trained to provide prosody information. The consistent mapping of sounds to corresponding linguistic feature values (e.g., phoneme identifiers) across multiple languages can facilitate providing prosody for multiple languages with a single model (e.g., a single trained neural network 140).

The computing system 120 also determines a language of the text 121. In some implementations, the computing system 120 receives data indicating the language of the text 121 from the computing system or storage device that provided the text 121. In some implementations, the computing system 120 analyzes the text 121 to determine the language of the text 121, for example, by comparing terms in the text 121 to terms in lexicons for one or more languages.

Once the language of the text 121 is determined, the computing system 120 determines a language identifier 126 corresponding to the language of the text 121. For example, if the text 121 is in English, the computing system 120 determines a language identifier 126 for the English language. If the text 121 is in Spanish, the computing system 120 determines a language identifier 126 for the Spanish language.

A different language identifier may be mapped to each of the different languages of utterances used to train the neural network 140. For example, the language identifier for English may be "0," the language identifier for Spanish may be "1," the language identifier for French may be "3," and so on. The computing system 120 may access stored data that indicates the language identifier corresponding to each language. The same mapping of language identifiers to languages can be used during training of the neural network 140 and while using the trained neural network 140 to provide prosody information for speech synthesis. For example, if the text 121 is in English, and the language identifier corresponding to the English language was "0" during training of the neural network 140, the language identifier 126 selected for the text 121 can be "0" to indicate that the speech being synthesized is in English.

The computing system 120 provides data indicating the linguistic features 122 and the language identifier 126 to the neural network 140. In response, the neural network 140 provides neural network outputs 142 that indicate prosody information for the linguistic features 122. For example, the neural network outputs 142 may indicate a duration, an energy level, and one or more fundamental frequency coefficients for each of the linguistic features 122.

As discussed further below with respect to FIG. 2, the computing system 120 may perform further processing to identify linguistic groups within the sequence of linguistic features 122. The computing system 120 may then provide the linguistic features 122 to the neural network 140 one linguistic group at a time, so that the neural network 140 produces the outputs 142 based on different subsets of the linguistic features 122 rather than the entire set of linguistic features 122.

In some implementations, limiting the amount of context provided to the neural network may facilitate cross-language learning during training of the neural network 140. While a full word or phrase may be too specific for overlapping usage to occur in multiple languages, a shorter sequence of phonemes such as the set of phonemes in a stress group may have more commonality among languages. In addition, setting the boundaries of linguistic groups may also allow the different groups to be more easily across multiple languages. Accordingly, in some implementations, during use of the trained neural network 140, the input to the neural network 140 indicates the phonemes in a single linguistic group, and not the content of the entire utterances. Information about the whole utterance may be provided to a text-to-speech module, for example, in the form of general linguistic features such as the number of words in the utterance.

By providing the language identifier 126 as input to the neural network 140, the computing system 120 indicates the target language for which the neural network should generate prosody information. The language identifier 126 can be a signal to the neural network 140 to produce prosody information targeted for a specific one of the multiple languages that the neural network 140 has been trained to model. Different languages can have different prosody characteristics. For the given sequence of phones, prosody may be different when the sequence is pronounced in one language compared to another language. Thus a particular sequence of phones provided to the neural network 140 may result in a different set of outputs 142 when provided with a different language identifier, since the neural network 140 may provide outputs 142 that reflect at least some of the unique prosody characteristics of the target language.

The computing system 120 uses the outputs 142 from the neural network 140 to generate audio data 160 representing the text 121. For example, the computing system 120 can provide the outputs 142 to a text-to-speech synthesis module 150. The prosody information indicated by the outputs 142 can be used with any of various text-to-speech systems. For example, the text-to-speech synthesis module 150 may use unit selection, generative synthesis, or other techniques to generate the audio data 160.

As an example, prosody information may be used in a unit selection system that, for example, synthesizes speech by selecting recorded speech samples and concatenating the selected samples together. The prosody information from the outputs 142 may be used to estimate the prosody targets for the selection of units (e.g., samples of human speech). Unit selection speech synthesis systems typically use a cost function to evaluate different units. The unit determined to minimize the cost function may be selected for inclusion in the audio output. Prosody characteristics can be used in the cost function for the selection of units, which biases the selection process so that units are selected to match or approximate the prosody characteristics indicated by the outputs 142.

As another example, prosody information may be used in a generative speech synthesis system that, for example, determines frequency components that may be combined to approximate speech without using recorded speech samples. For example, a generative speech synthesis system may generate audio coefficients to be used in a vocoder. The prosody information indicated by the outputs 142 may be used to shape the fundamental frequency contour of speech produced by the generative system. For example, a generative system may produce a fundamental frequency contour, and the prosody information indicated by the outputs 142 may be used to alter or replace the contour produced by the generative system. In some instances, the prosody information indicated by the outputs 142 corrects for over-smoothing of the fundamental frequency contour by the generative system to produce a richer overall rhythm.

The computing system 120 provides the audio data 160 to the client device 110 over the network 130. The client device 110 may then play the audio with a speaker for a user 102 to hear, store the audio data 160 for later use, or otherwise use the received audio data 160. In some implementations, the audio data 160 is played or otherwise used by the computing system 120 instead of or in addition to transmitting the audio data 160 to the client device 110.

Figure 2:
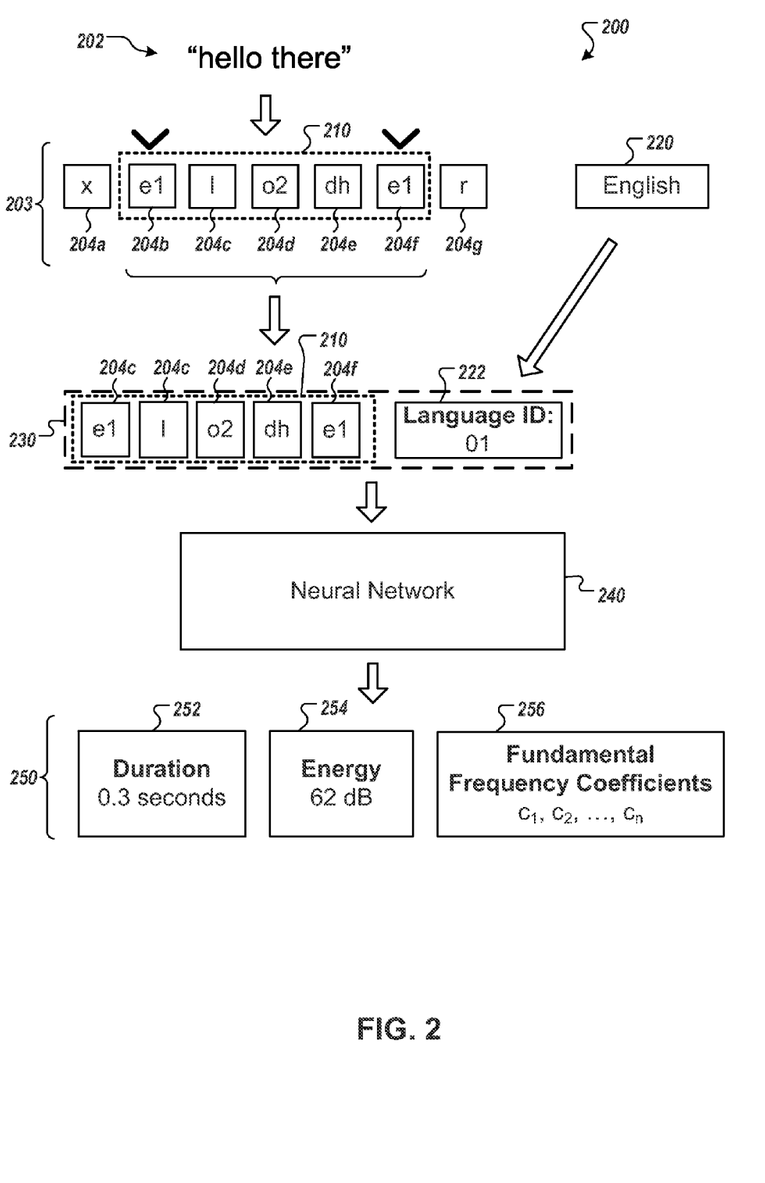
FIG. 2 is a diagram that illustrates an example of processing for multilingual prosody generation.

FIG. 2 is a diagram 200 that illustrates an example of processing for multilingual prosody generation. The diagram 200 illustrates in greater detail processing that the computing system 120 or another computing system may perform to obtain prosody information for use in synthesizing speech.

In the example of FIG. 2, the computing system 120 obtains prosody information for a text 202, which includes the phrase "hello there." The computing system 120 extracts linguistic features (e.g., phonemes) from the text 202. For example, the computing system 120 determines a sequence 203 of phonetic units 204a-204g that form a phonetic representation of the text 202. The phonetic units 204a-204g shown for the text 202 are the phones "x el 1 o2 dh el r."

The computing system 120 also determines the language 220 of the text 202 (e.g., English in the illustrated example), which is the target language that speech will be synthesized in. The computing system 120 determines a language identifier 222, which can be a value that corresponds to the language of the text 202. For example, the language identifier 222 can have a value that was used to indicate the language 220 during training of a neural network 240.

The computing system 120 determines which phonetic units 204a-204g are stressed in pronunciation of the text 202. The computing system 120 may obtain information indicating which phonetic units are stressed by looking up words in the text 202 in a lexicon or other source. A stressed sound may differ from unstressed sound, for example, in pitch (e.g., a pitch accent), loudness (e.g., a dynamic accent), manner of articulation (e.g., a qualitative accent), and/or length (e.g., a quantitative accent). The type of stress determined can be lexical stress, or the stress of sounds within individual words. In the illustrated example, the phonetic unit 204b "e1" and the phonetic unit 204f "e1" are identified as being stressed. In some implementations, a different linguistic symbol may be used to represent a stressed phonetic unit. For example, the label "e1" may represent a stressed "e" sound and the label "e2" may represent an unstressed "e" sound.

The computing system 120 determines groups of phonetic units 204a-204g that form linguistic groups. The computing system 120 may determine the linguistic groups based on the locations of stressed syllables in the sequence 203. For example, the stressed phonetic units 204b, 204f can serve as boundaries that divide the sequence 203 into linguistic groups that each include a different portion of the sequence 203. A linguistic group can include multiple phonemes. The linguistic groups are defined so that every phonetic unit in the sequence 203 is part of at least one of the linguistic groups. In some implementations, the linguistic groups are overlapping subsequences of the sequence 203. In some implementations, the linguistic groups are non-overlapping sub-sequences of the sequence 203.

A linguistic group may be defined to include two stressed phonetic units nearest each other and the unstressed phonetic units between the stressed phonetic units. For example, the linguistic group 210 is defined to be the set of phonetic units from 204b to 204f, e.g., "e1 l o2 dh e1." Linguistic groups may also be defined from the beginning of an utterance to the first stressed phonetic unit and from the last stressed phonetic unit to the end of the utterance. For example, For example, the sequence 203 may divided into three linguistic groups: a first group "x e1," a second group "e1 l o2 dh e1," and a third group "e1 r." In this manner, the stressed phonetic units overlap between adjacent linguistic groups. When linguistic groups overlap, if different prosody information is generated for the overlapping phonetic units, the different prosody values may be combined (e.g., weighted, averaged, etc.) or one set of prosody information may be selected.

To obtain prosody information, the computing system 120 provides an input data set 230 to the trained neural network 240. The input data set 230 includes the language identifier 222 that indicates that target language for which prosody information is desired. The input data set 230 also includes data that indicates the linguistic features in one of the linguistic groups. For example, the input data set 230 may include data identifying each of the phonetic units 204b-204f in the linguistic group 210. The phonetic units in the linguistic group are expressed in binary codes so that the neural network 240 can process them. Each of the possible phonetic units that may occur in one or more languages can be mapped to a different value. The value that is selected as input to represent a particular phonetic unit can be the same value used to represent the particular phonetic unit during training of the neural network 240, and the same sound or phonetic unit can be represented by the same code across all languages used to train the neural network 240. In some implementations, the input data set 230 may include other information, such as the position of the linguistic group 210 within the utterance 202.

For each set of input data provided, the neural network 240 provides a corresponding set of output data. In the example, the neural network provides output values that indicate the information shown in output data set 250 in response to receiving the input data set 230. The output data can indicate prosody information for the linguistic group indicated in the input data set 230. Thus, the neural network 240 can map linguistic groups to prosody values. In some implementations, the prosody values are the same for each phonetic unit in a linguistic group, e.g., the output data set 250 can represent prosody for the linguistic group 210 as a whole.

The output data set 250 includes various parameters that indicate characteristics for synthesizing the portion of the utterance 202 corresponding to the linguistic group 210. The output data set 250 includes a duration value 252, which indicates the duration of the sounds corresponding to the linguistic group. The output data set 250 also includes an energy value 254, which indicates a loudness or intensity for the sounds corresponding to the linguistic group 210. The output data set 250 also includes various fundamental frequency coefficients 256, $c_1, c_2, \ldots, c_n$, which may define fundamental frequency characteristics for synthesized speech of the linguistic group 210.

Additional input data sets can be provided to the neural network to obtain output data sets with prosody information for other linguistic groups in the sequence 203, until prosody information has been received for all linguistic groups in the sequence 203. For example, an input data set indicating the sequence of phonetic units "e1 r" may be provided to the neural network 240 to obtain prosody values for the linguistic group that occurs after the linguistic group 210 in the sequence 203.

Using the output data sets for the respective linguistic groups, a fundamental frequency contour for the linguistic group 210 may be determined. The frequency coefficients for each of the linguistic groups may be used to model a fundamental frequency curve using, for example, approximation polynomials, splines, or discrete cosine transforms. The duration and energy values for each linguistic group can be used to indicate the appropriate length and relative loudness or intensity of sound for each linguistic group.

The fundamental frequency contours for each linguistic group may be concatenated together and used, with duration and energy values, to provide prosody information for the entire text 202. The prosody information may be used to generate synthesized speech data for the text 202, for example, using unit-selection speech synthesis or generative speech synthesis. For example, the prosody information may be used to set prosody targets for selecting units in a unit selection synthesis system. The prosody information for a particular phonetic unit can be used in the target cost as a way to select a unit that matches the prosody estimated by the neural network 240 for the particular phonetic unit. As another example, the prosody determined using the output of the neural network 240 may be used to adjust the prosody determined by a generative speech synthesis system, for example, to add shape to a contour that may be excessively smoothed.

Figure 3:
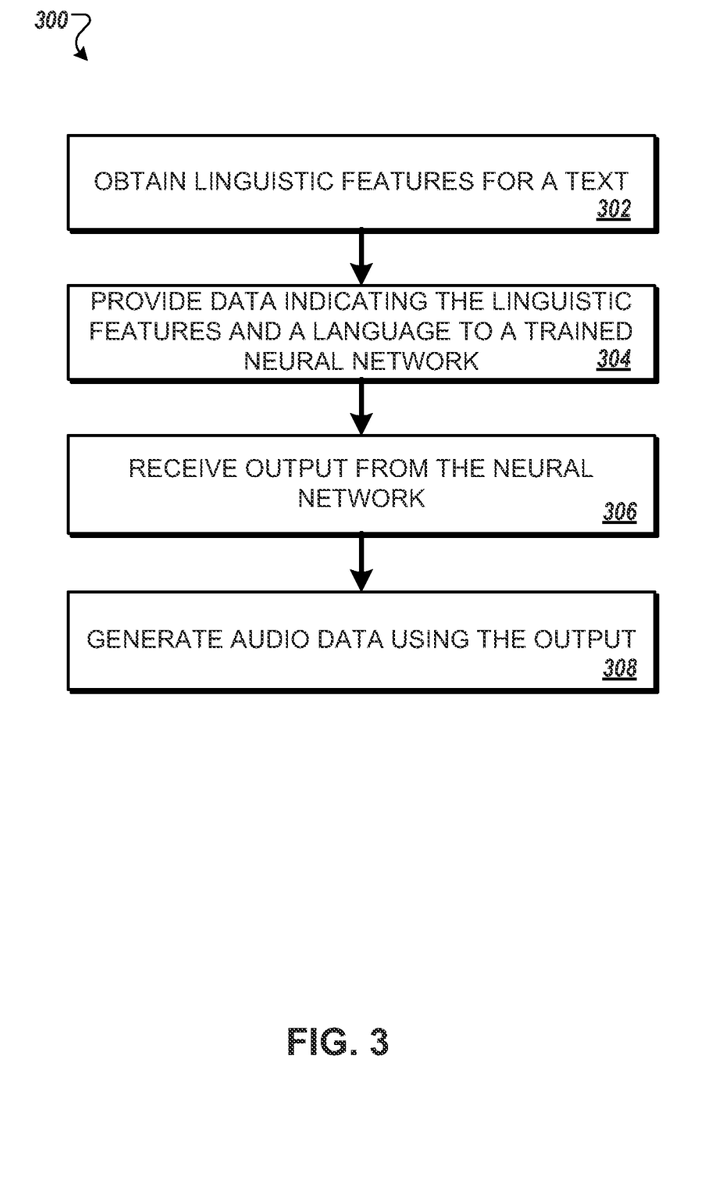
FIG. 3 is a flow diagram that illustrates an example of a process for multilingual prosody generation.

FIG. 3 is a flow diagram that illustrates an example of a process 300 for multilingual prosody generation. The process 300 may be performed by data processing apparatus, such as the computing system 120 described above or another data processing apparatus.

Data indicating a set of linguistic features corresponding to a text is obtained (302). For example, a sequence of phonetic units, such as phonemes, in a phonetic representation of the text can be obtained. The data can be obtained by analysis of the text, receiving data from another system, accessing from data storage, or other means.

Data indicating the linguistic features and data indicating the language of the text are provided as input to a trained neural network (304). The neural network has been trained to provide output indicating prosody information for multiple languages. The neural network can be a neural network that has been trained using speech in multiple languages.

In some implementations, a linguistic group is determined, where the linguistic group includes a subset of the linguistic features in the set of linguistic features. The subset can include fewer than all of the linguistic features in the text, for example, only linguistic features a portion of a word or phrase in a text for which speech is to be synthesized. The data that is input to the neural network may include data indicating the subset of linguistic features in the linguistic group. For example, for a given input data set, the linguistic features in a single linguistic group may be provided, and one or more linguistic features of other linguistic groups may be excluded. The output received from the neural network may include output indicating prosody information for a portion of or all of the particular linguistic group represented by the subset of linguistic features provided as input.

A linguistic group may be determined based on a position of one or more stressed linguistic features in the sequence of linguistic features. For example, data that indicates two or more stressed linguistic features in a sequence of linguistic features can be obtained. The stressed linguistic features and the linguistic features between the stressed linguistic features can be defined as the linguistic group.

A linguistic group may be determined to be a sequence of linguistic features that occurs consecutively from a first stressed linguistic feature to the next stressed linguistic feature. A linguistic group may also determined to be the series of consecutive linguistic features from the beginning of a sequence to the first stressed linguistic feature, or from the last stressed linguistic feature to the end of the sequence. The type of stress used to define a linguistic group may be, for example, linguistic stress, intra-word stress, syllabic stress, lexical stress, or a combination thereof.

Output indicating prosody information for the linguistic features is received from the neural network (306). The output can indicate prosody characteristics suitable for the language of the text indicated to the neural network. The output may indicate one or more prosody characteristics influenced by the characteristics of one or more languages other than the language of the text. The output from the neural network can indicate one or more of a duration, an energy level, and one or more fundamental frequency coefficients.

Audio data representing the text (e.g., audio data) is generated using the output of the neural network (308). The audio representation can include data that represents a synthesized utterance of the text. The audio representation may be generated as an audio data file (e.g., a waveform file, MPEG audio file, or data in any appropriate audio data format), a bitstream, or other appropriate form. The audio representation may be generated without played audibly by the system generating the audio representation or any other system. The audio representation may be generated using the output of the neural network and recorded speech samples in a unit selection text-to-speech module. For example, prosody characteristics indicated by the output of the neural network can be used to select speech samples to include in the audio representation (e.g., using unit-selection synthesis). The audio representation maybe generated using the output of the neural network and a generative speech synthesis module. For example, the output of the neural network may be used to modify a fundamental frequency contour produced by the generative speech synthesis module. The prosody characteristics may be combined with audio coefficients representing synthesized speech characteristics, such as values indicating frequency components for multiple frequency bands. Example techniques that may be used include formant synthesis, additive frequency synthesis, and selection of vocoder coefficients.

In some implementations, the neural network is used to generate prosody information for speech in multiple languages. For example, the operations shown in FIG. 4 can be performed for a first language, and can also be performed for a second language that is different than the first language. For example, in addition to generating an audio representation of a first text in a first language, data indicating a set of second linguistic features corresponding to a second text in a second language is obtained. The data indicating the second linguistic features and data indicating the language of the second text are provided as input to the neural network. Second output from the neural network indicates prosody information for the second linguistic features, and the second output can be used to generate an audio representation of the second text.

The neural network used to obtain prosody information for both the first text and the second text can be a neural network trained speech in the first language and speech in the second language. The same neural network may be used to obtain prosody information for the first text in the first language and the second text in the second language. The neural network can have the same state of training (e.g., the same set of internal weight values or other parameters defining the properties of the neural network) when used to obtain prosody information for the first text as when used to obtain prosody information for the second text.

In some implementations, multiple linguistic groups are determined from within the set of linguistic features. Each of the multiple linguistic groups including a different portion (e.g., sub-sequence) of a sequence of linguistic features corresponding to the text. The multiple linguistic groups may overlap. For each of the multiple linguistic groups, data indicating the linguistic features in the linguistic group and data indicating the language of the text are provided to the neural network. The neural network provides a set of output indicating prosody information for each of the multiple linguistic groups. To generate the audio data representing the text, the output of the neural network can be used to determine a fundamental frequency contour for each of the multiple linguistic groups. The respective fundamental frequency contours for the multiple linguistic groups can be concatenated to generate a continuous fundamental frequency contour for the text, and the audio representation can be generated using the continuous fundamental frequency contour. To model the fundamental frequency contour, various approaches may be employed, such as using coefficients of an approximation polynomial, using splines, or using discrete cosine transforms.

Figure 4:
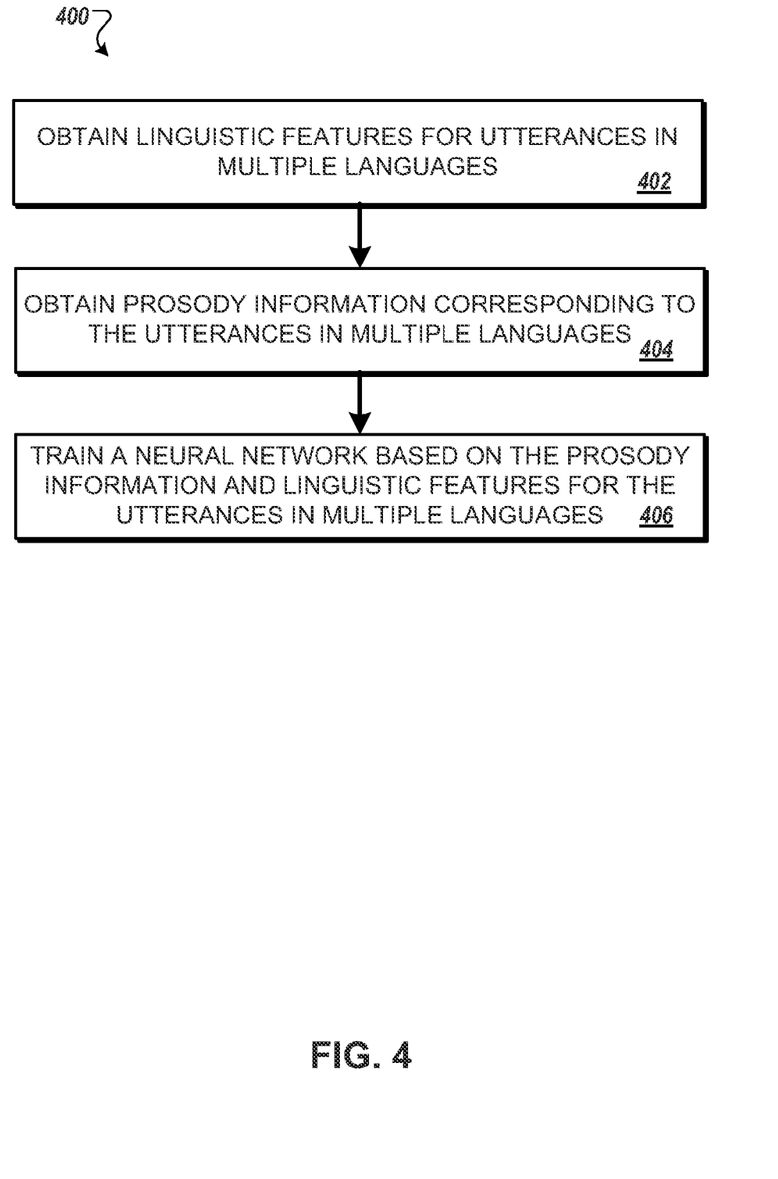
FIG. 4 is a diagram that illustrates an example of processing to train a neural network.

FIG. 4 is a diagram that illustrates an example of processing for training a neural network. The process 400 may be performed by data processing apparatus, such as the computing system 120 described above or another data processing apparatus.

Linguistic features obtained for utterances in multiple languages (402). A set of training data including various recorded utterances may be obtained. The training data includes utterances for each of multiple different languages. For example, training data may include some utterances in English, some utterances in Spanish, some utterances in French, and so on. For each utterance, a language identifier is assigned to indicate the language of the utterance. For example, all English utterances may be assigned a language identifier of "0," all Spanish utterances may be assigned a language identifier of "1," and so on.

A set of linguistic features (e.g., a sequence of phonemes or other phonetic units) may be determined for each utterance. For example, a transcription for each of the utterances is accessed, and linguistic features can be determined based on the transcriptions.

Prosody information is obtained that corresponds to the utterances in multiple languages (404). Prosody parameters can be extracted for each of the utterances in the training data. The extracted prosody parameters can include the duration, energy, and fundamental frequency contour corresponding to each linguistic feature in each of the utterances. For each utterance, the linguistic groups in the set of linguistic features for the utterance can also be identified. The fundamental frequency contour for a linguistic group can be approximated by a set of N coefficients. Duration, energy, and other prosody parameters may each be encoded as one or more values. The extracted prosody parameters for an utterance may be aligned with the set of linguistic features for the utterance, so that the prosody for each individual linguistic feature is known.

A neural network is trained using the linguistic features and the prosody information (406). During training, input data to the neural network can each indicate a linguistic group from an utterance and a language identifier for the utterance.

The target output of the neural network is the encoded set of prosody parameters that were extracted from the portions of the training utterance corresponding to the linguistic group. An iterative training algorithm such as back propagation (e.g., backward propagation of errors) can be used to train the neural network. For example, each training iteration can involve inputting data indicating a linguistic group and a language identifier, and forward propagating through the neural network. Backward propagation from the corresponding training target, e.g., the with the prosody parameters corresponding to the linguistic group, can also be performed to generate error values for the various nodes or neurons in the neural network. The weights of the neural network can then be updated to reduce the errors.

Several training iterations may be performed for each utterance in the set of training data. For example, for a particular utterance, there may be a separate iteration for each linguistic group corresponding to a training utterance. Training may proceed in this manner for each utterance in the set of training data.

Because the set of training data includes utterances from multiple languages, the weights of a single neural network are updated based on the prosody of utterances in multiple languages. In this manner, the training may permit the neural network to make associations between the prosody characteristics of different languages, and to implicitly learn correlations and commonalties among the prosody exhibited in the training data. The training process may produce a set of neural network weights that are based on characteristics of speech of multiple languages.

The trained neural network may be able to provide prosody information corresponding to different languages, where the prosody characteristics that are output vary from one language to another. The neural network can be trained to provide prosody information that is appropriate for a particular language based on a language identifier for the particular language. For example, the neural network may be trained to provide prosody parameters appropriate for a first language when a first language identifier is input, and to provide prosody parameters for a second, different language when a second, different language identifier is input.

Training of the neural network may continue until a level of error is below a threshold. For example, training may be ended when the error between (i) the actual prosody parameters extracted from an utterance of a text and (ii) the prosody parameters output by the neural network for synthesis of the text is below a threshold. In some implementations, testing may conclude after a pre-determined number or percentage of tests show acceptable levels of error. As an alternative, training may end when a maximum number of training iterations or operations is reached.

In some implementations, the neural network may be trained to provide prosody information for individual linguistic features within a linguistic group. Accordingly, a training iteration may be performed for each linguistic feature in each linguistic group for each utterance, with a target output corresponding a particular linguistic feature. A feature index or other value may indicate which linguistic feature corresponds to the target output. A neural network so trained may be used to determine prosody for individual features within linguistic groups.

Figure 5:
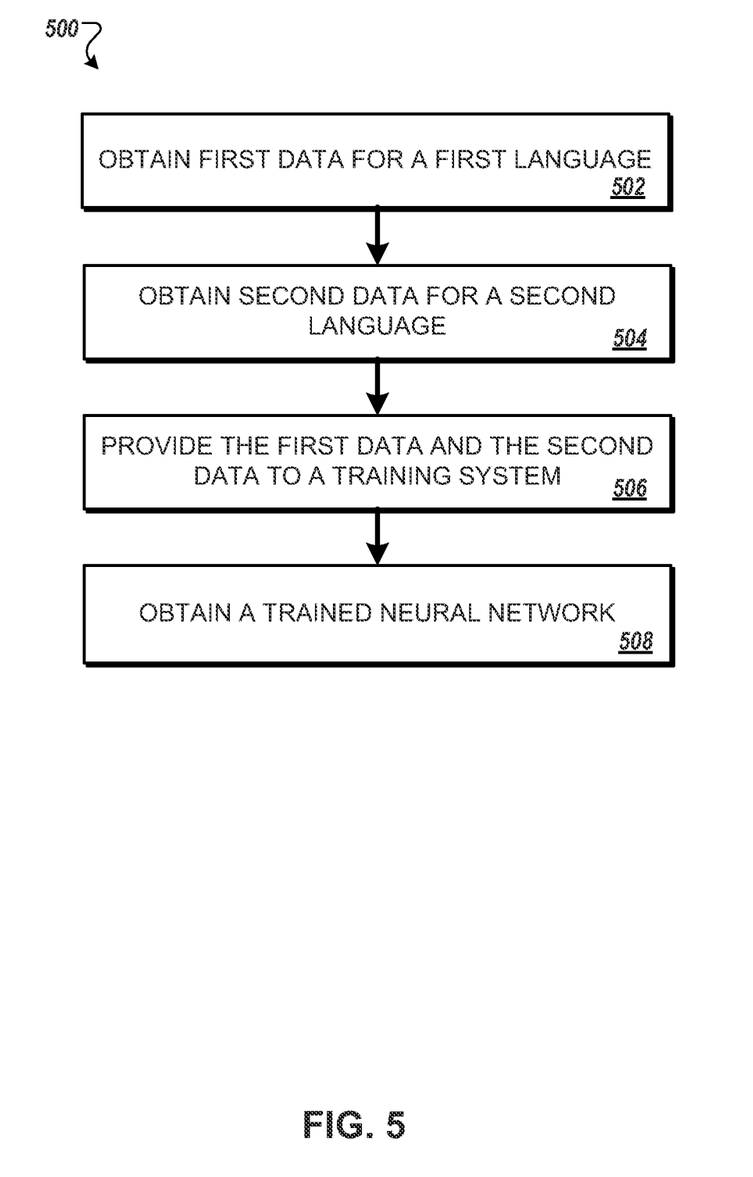
FIG. 5 is a flow diagram that illustrates an example of a process for training a neural network.

FIG. 5 is a flow diagram that illustrates an example of a process 500 for training a neural network. The process 500 may be performed by data processing apparatus, such as the computing system 120 described above or another data processing apparatus.

A first set of data is obtained for a first language (502). The first set of data includes, for example, (i) first speech data for utterances in the first language, (ii) data indicating a transcription for the first speech data, and (iii) data identifying the first language.

A second set of data is obtained for a second language that is different from the first language (504). The second set of data includes, for example, (i) second speech data for utterances in the first language, (ii) data indicating a transcription for the second speech data, and (iii) data identifying the second language.

The first set of data for the first language and the second set of data for the second language are provided to a system configured to train a neural network (506).

A neural network is obtained that is trained based on the first set of data for the first language and the second set of data for the second language (508). The neural network is trained to indicate prosody information for the first language and the second language. For example, a set of neural network weights that configure a neural network to provide prosody information for each of multiple different languages may be received. The neural network can be configured to receive input including a value that indicates which of multiple languages prosody information is desired, and to provide data indicating prosody characteristics corresponding to the indicated language in response.

A number of implementations have been described. Nevertheless, it will be understood that various modifications may be made without departing from the spirit and scope of the disclosure. For example, various forms of the flows shown above may be used, with steps re-ordered, added, or removed.

All of the functional operations described in this specification may be implemented in digital electronic circuitry, or in computer software, firmware, or hardware, including the structures disclosed in this specification and their structural equivalents, or in combinations of one or more of them. The techniques disclosed may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, the techniques disclosed may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may include a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A method performed by data processing apparatus, the method comprising:
    obtaining data indicating a set of linguistic features corresponding to a text;
    providing (i) data indicating the linguistic features and (ii) data indicating the language of the text as input to a neural network that has been trained to provide output indicating prosody information for multiple languages, the neural network having been trained using speech in multiple languages;
    receiving, from the neural network, output indicating prosody information for the linguistic features; and
    generating audio data representing the text using the output of the neural network.

2. The method of claim 1, wherein the text is a first text in a first language;
    wherein the method further comprises:
        obtaining data indicating a set of second linguistic features corresponding to a second text in a second language that is different from the first language;
        providing (i) data indicating the second linguistic features and (ii) data indicating the language of the second text as input to the neural network that has been trained to provide output indicating prosody information for multiple languages;
        receiving, from the neural network, second output indicating prosody information for the second linguistic features; and
        generating an audio representation of the second text using the second output of the neural network.

3. The method of claim 1, wherein receiving, from the neural network, output indicating prosody information comprises receiving data indicating one or more of a duration, an energy level, and one or more fundamental frequency coefficients.

4. The method of claim 1, further comprising determining a linguistic group that includes a subset of the linguistic features in the set of linguistic features;
   wherein providing data indicating the linguistic features to the neural network comprises providing data indicating the subset of linguistic features in the linguistic group as input to the neural network; and
   wherein receiving, from the neural network, output indicating prosody information for the linguistic features comprises receiving, from the neural network, output indicating prosody information for the linguistic group.

5. The method of claim 4, wherein obtaining data indicating the set of linguistic features corresponding to the text comprises obtaining data indicating a sequence of linguistic features in a phonetic representation of the text; and
   wherein determining the linguistic group comprises determining the linguistic group based on a position of one or more stressed linguistic features in the sequence of linguistic features.

6. The method of claim 1, further comprising determining multiple linguistic groups within the set of linguistic features, each of the multiple linguistic groups including a different portion of the set of linguistic features;
   wherein providing (i) data indicating the linguistic features and (ii) data indicating the language of the text as input to the neural network comprises providing, for each of the multiple linguistic groups, data indicating the linguistic features in the linguistic group and data indicating the language of the text;
   wherein receiving, from the neural network, the output indicating prosody information for the linguistic features comprises receiving, from the neural network, a set of output indicating prosody information for each of the multiple linguistic groups; and
   wherein generating the audio data representing the text using the output of the neural network comprises:
      using the output of the neural network to determine a fundamental frequency contour for each of the multiple linguistic groups;
      concatenating the fundamental frequency contours for the multiple linguistic groups to generate a continuous fundamental frequency contour for the text; and
      generating the audio representation using the continuous fundamental frequency contour.

7. The method of claim 1, wherein generating the audio data representing the text using the output of the neural network comprises selecting one or more recorded speech samples based on the output of the neural network.

8. The method of claim 1, wherein generating the audio data representing the text using the output of the neural network comprises generating the audio representation using the output of the neural network and audio coefficients representing synthesized speech characteristics.

9. A system comprising:
   one or more computers and one or more storage devices storing instructions that are operable, when executed by the one or more computers, to cause the one or more computers to perform operations comprising:
      obtaining data indicating a set of linguistic features corresponding to a text;
      providing (i) data indicating the linguistic features and (ii) data indicating the language of the text as input to a neural network that has been trained to provide output indicating prosody information for multiple languages, the neural network having been trained using speech in multiple languages;
      receiving, from the neural network, output indicating prosody information for the linguistic features; and
      generating audio data representing the text using the output of the neural network.

10. The system of claim 9, wherein the text is a first text in a first language;
    wherein the operations further comprise:
      obtaining data indicating a set of second linguistic features corresponding to a second text in a second language that is different from the first language;
      providing (i) data indicating the second linguistic features and (ii) data indicating the language of the second text as input to the neural network that has been trained to provide output indicating prosody information for multiple languages;
      receiving, from the neural network, second output indicating prosody information for the second linguistic features; and
      generating an audio representation of the second text using the second output of the neural network.

11. The system of claim 9, wherein receiving, from the neural network, output indicating prosody information comprises receiving data indicating one or more of a duration, an energy level, and one or more fundamental frequency coefficients.

12. The system of claim 9, wherein the operation further comprise determining a linguistic group that includes a subset of the linguistic features in the set of linguistic features;
    wherein providing data indicating the linguistic features to the neural network comprises providing data indicating the subset of linguistic features in the linguistic group as input to the neural network; and
    wherein receiving, from the neural network, output indicating prosody information for the linguistic features comprises receiving, from the neural network, output indicating prosody information for the linguistic group.

13. The system of claim 12, wherein obtaining data indicating the set of linguistic features corresponding to the text comprises obtaining data indicating a sequence of linguistic features in a phonetic representation of the text; and
    wherein determining the linguistic group comprises determining the linguistic group based on a position of one or more stressed linguistic features in the sequence of linguistic features.

14. The system of claim 9, wherein the operations further comprise determining multiple linguistic groups within the set of linguistic features, each of the multiple linguistic groups including a different portion of the set of linguistic features;
    wherein providing (i) data indicating the linguistic features and (ii) data indicating the language of the text as input to the neural network comprises providing, for each of the multiple linguistic groups, data indicating the linguistic features in the linguistic group and data indicating the language of the text;
    wherein receiving, from the neural network, the output indicating prosody information for the linguistic features comprises receiving, from the neural network, a set of output indicating prosody information for each of the multiple linguistic groups; and
    wherein generating the audio data representing the text using the output of the neural network comprises:
      using the output of the neural network to determine a fundamental frequency contour for each of the multiple linguistic groups;

concatenating the fundamental frequency contours for the multiple linguistic groups to generate a continuous fundamental frequency contour for the text; and
generating the audio representation using the continuous fundamental frequency contour.

15. The system of claim 9, wherein generating the audio data representing the text using the output of the neural network comprises selecting one or more recorded speech samples based on the output of the neural network.

16. The system of claim 9, wherein generating the audio data representing the text using the output of the neural network comprises generating the audio representation using the output of the neural network and audio coefficients representing synthesized speech characteristics.

17. A computer-readable storage device storing a computer program, the program comprising instructions that when executed by one or more computers cause the one or more computers to perform operations comprising:
  obtaining data indicating a set of linguistic features corresponding to a text;
  providing (i) data indicating the linguistic features and (ii) data indicating the language of the text as input to a neural network that has been trained to provide output indicating prosody information for multiple languages, the neural network having been trained using speech in multiple languages;
  receiving, from the neural network, output indicating prosody information for the linguistic features; and
  generating audio data representing the text using the output of the neural network.

18. The computer-readable storage device of claim 17, wherein the text is a first text in a first language;
wherein the operations further comprise:
  obtaining data indicating a set of second linguistic features corresponding to a second text in a second language that is different from the first language;
  providing (i) data indicating the second linguistic features and (ii) data indicating the language of the second text as input to the neural network that has been trained to provide output indicating prosody information for multiple languages;
  receiving, from the neural network, second output indicating prosody information for the second linguistic features; and
  generating an audio representation of the second text using the second output of the neural network.

19. The computer-readable storage device of claim 17, wherein receiving, from the neural network, output indicating prosody information comprises receiving data indicating one or more of a duration, an energy level, and one or more fundamental frequency coefficients.

20. The computer-readable storage device of claim 17, wherein the operations further comprise determining a linguistic group that includes a subset of the linguistic features in the set of linguistic features;
  wherein providing data indicating the linguistic features to the neural network comprises providing data indicating the subset of linguistic features in the linguistic group as input to the neural network; and
  wherein receiving, from the neural network, output indicating prosody information for the linguistic features comprises receiving, from the neural network, output indicating prosody information for the linguistic group.

* * * * *